US011681516B2

(12) United States Patent
Huth et al.

(10) Patent No.: US 11,681,516 B2
(45) Date of Patent: Jun. 20, 2023

(54) COMPUTER-IMPLEMENTED METHOD AND DEVICE FOR THE UPDATE MANAGEMENT OF DIFFERENT VERSIONS OF DISTRIBUTED SOFTWARE WITH THE AID OF MACHINE LEARNING METHODS

(71) Applicant: Robert Bosch GmbH, Stuttgart (DE)

(72) Inventors: Christopher Huth, Weil der Stadt (DE); Anupam Sarkar, Kolkata (IN); Simon Greiner, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 112 days.

(21) Appl. No.: 17/325,717

(22) Filed: May 20, 2021

(65) Prior Publication Data

US 2022/0027142 A1    Jan. 27, 2022

(30) Foreign Application Priority Data

Jul. 27, 2020   (DE) .......................... 102020209420.9

(51) Int. Cl.
| | |
|---|---|
| *G06F 8/60* | (2018.01) |
| *G06F 8/65* | (2018.01) |
| *G06N 5/04* | (2023.01) |
| *G06N 20/00* | (2019.01) |

(52) U.S. Cl.
CPC ................ *G06F 8/65* (2013.01); *G06N 5/04* (2013.01); *G06N 20/00* (2019.01)

(58) Field of Classification Search
CPC ........................................................ G06F 8/65
See application file for complete search history.

(56) References Cited

U.S. PATENT DOCUMENTS

| | | | | |
|---|---|---|---|---|
| 5,361,201 A | * | 11/1994 | Jost ...................... | G06Q 40/02 705/35 |
| 2006/0184838 A1 | * | 8/2006 | Singonahalli ....... | G06F 11/3688 714/45 |
| 2009/0138854 A1 | * | 5/2009 | Mani ................... | G06F 11/3664 717/124 |
| 2015/0113517 A1 | * | 4/2015 | Bennah ................ | G06F 3/1207 717/170 |
| 2016/0019042 A1 | * | 1/2016 | Eberlein ............... | G06N 5/047 717/168 |

* cited by examiner

*Primary Examiner* — Jae U Jeon
(74) *Attorney, Agent, or Firm* — Norton Rose Fulbright US LLP; Gerard Messina

(57) ABSTRACT

A computer-implemented method for carrying out an update management for updating application software on data processing units. The method includes: providing an error model, which indicates a number of errors across software versions of the application software; determining an update sequence for data processing units, depending on their particular software version; and updating the application software or providing an update prompt to update the application software in the data processing units according to the update sequence.

14 Claims, 3 Drawing Sheets

COMPUTER-IMPLEMENTED METHOD AND DEVICE FOR THE UPDATE MANAGEMENT OF DIFFERENT VERSIONS OF DISTRIBUTED SOFTWARE WITH THE AID OF MACHINE LEARNING METHODS

CROSS REFERENCE

The present application claims the benefit under 35 U.S.C. § 119 of German Patent Application No. DE 102020209420.9 filed on Jul. 27, 2020, which is expressly incorporated herein by reference in its entirety.

FIELD

The present invention relates to software which is implemented in different versions in a distributed manner in a large number of data processing units, and, in particular, an update management for carrying out an update of the different software versions.

BACKGROUND INFORMATION

Application software may be operated on a large number of data processing units. For example, software applications may be operated on a large number of mobile telephones.

For this purpose, the software is generally distributed to the data processing units via a cloud system. Application software of this type is usually updated at regular time intervals, the updating not taking place at the same time in each data processing unit, since the cloud system would become overloaded thereby. Users of the data processing unit may also decide not to update the existing version of the application software, so that many versions of the application software are used by the users over the course of time.

Application software generally always has a number of errors. These errors may include unexpected program crashes, faulty links to data sources, an insufficient user function and the like. The number of errors generally varies from one version to another of the application software.

An attempt is made to correct these errors by updating the software application. With each update to a next higher version, some of these errors are correspondingly corrected. If a change is made to the software code during an update, an additional code portion is generally introduced. The additional code portion should correct at least a part of the existing errors but frequently results in the introduction of new errors.

SUMMARY

According to the present invention, a method is provided for carrying out an update management of application software, which is present in different versions on a large number of data processing units, a method for creating an error model, which maps a software version to a number of errors, as well as a corresponding update management system and a device for creating an error model.

Further embodiments are described herein.

According to one aspect of the present invention, a method is provided for carrying out an update management for updating application software on data processing units. In accordance with an example embodiment of the present invention, the method includes the following steps:
Providing an error model, which indicates a number of errors across software versions of the application software;
Determining an update sequence for data processing units, depending on their particular software version;
Updating the application software or providing an update prompt to update the application software in the data processing units according to the update sequence.

When updating application software on many data processing units, a so-called update management takes effect, in which it is decided which of the data processing units will be offered an update of the application software at which point in time. This is used primarily to control the load in the cloud system distributing the update code, so that the cloud system is not overloaded by an excessively large number of data processing units requesting the update code at the same time. The update management is used to determine the sequence of data processing units being offered the update and the points in time of the update offer.

When offering the update, it may be sensible to give priority to those software versions in which a large number of software errors are present. For this purpose, however, it is necessary for the number of software errors to be known for the different versions of the application software. The ascertainment of the number of errors in a software code of a software version may take place, for example, based on conventional analysis and/or test methods, e.g., by fuzz testing or fuzzing.

Since the analysis and/or test methods are complex, a high use of resources would be necessary to test each of the possible software versions for the purpose of ascertaining the correspondingly assigned number of errors. One feature of the above method is to create a data-based error model, which indicates the number of errors contained in the corresponding program code of the application software across the series of consecutive versions of an application software.

In accordance with an example embodiment of the present invention, it may be provided that the update sequence is determined depending on the number of errors of the software version according to the error model, and possibly depending on the age of the software version and/or the number of data processing units on which the software version is operated.

The trained error model thus makes it possible to detect which of the software versions of the application software should be updated next. In particular, the information, derivable from the error model, as to which of the software versions in use has the largest number of errors may be used for this purpose.

According to a further aspect of the resent invention, a method is provided for creating an error model, which assigns a number of errors to a software version, the error model being successively trained. In accordance with an example embodiment of the present invention, the method includes the following steps:
Carrying out an analysis and/or test method to ascertain a number of errors for a software version;
Retraining the error model using a training data set, which assigns a number of errors to a software version.

The above method therefore provides for creating the error model without testing all the software versions for their number of errors. This may be achieved by training a data-based regression model. During the creation of the error model, only those software versions which have a high degree of uncertainty for the error model are always tested. This makes it possible to generate an error model, which outputs a number of errors across the software versions without having to test each of the software versions with the aid of a complex analysis and/or test method. The error model is then used in such a way that, when deciding on a sequence of an update of the software, those software versions are preferred which have a high or the highest number of errors.

It may be provided that the training of the error model is ended when a maximum of a prediction uncertainty of the error model drops below a threshold value. In particular, the error model may include a regression model, in particular a Gaussian process model or a Bayesian neural network.

According to a further aspect of the present invention, an update management system, in particular a central unit, is provided for carrying out an update management for updating application software on data processing units. In accordance with an example embodiment of the present invention, the update management system is designed to:

Receive an, in particular, data-based error model, which indicates a number of errors across software versions of the application software;

Determine an update sequence for data processing units, depending on their particular software version;

Update the application software or provide an update prompt to update the application software in the data processing units according to the update sequence.

According to a further aspect of the present invention, a device is provided for creating a data-based error model, which assigns a number of errors to a software version. In accordance with an example embodiment of the present invention, the device is designed to successively train the error model, including the following steps:

Carrying out an analysis and/or test method to ascertain a number of errors for a software version;

Retraining the error model using a training data set, which assigns a number of errors to a software version.

BRIEF DESCRIPTION OF THE DRAWINGS

Specific embodiments are explained in greater detail below on the basis of the figures.

DETAILED DESCRIPTION OF EXAMPLE EMBODIMENTS

Figure 1:
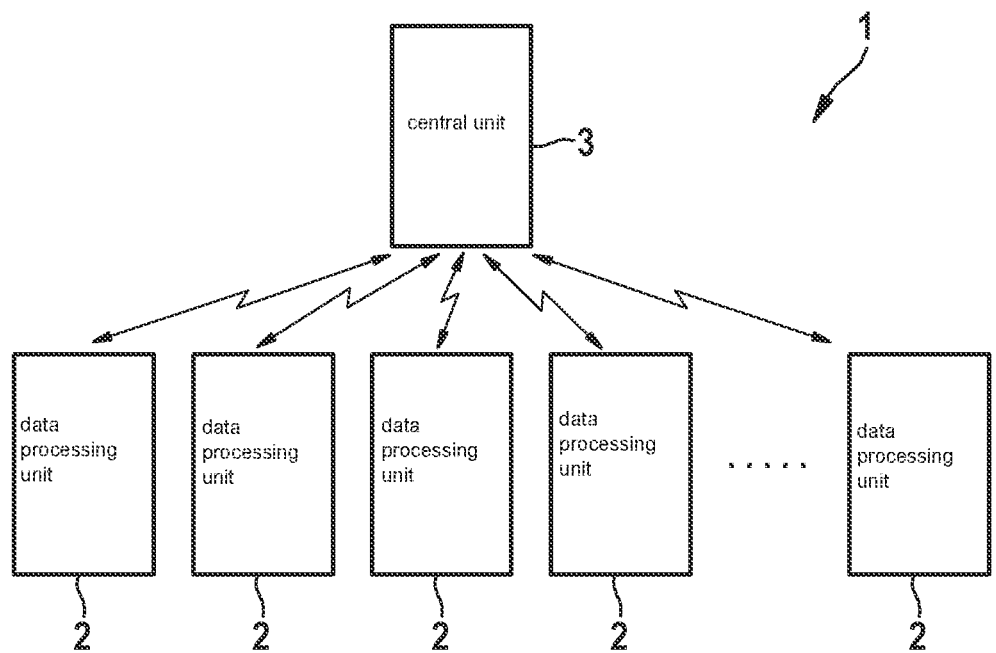
FIG. 1 shows a distributed system, including a large number of data processing units, which may be provided with software versions and updates via a central unit.

FIG. 1 shows a distributed system 1, including a large number of data processing units 2, which are each connected to a central unit 3, in particular a cloud system, via a communication link. An application software, which was further developed by frequent updates, is implemented in data processing units 2. In addition, the application software may be implemented in different software versions, e.g., using different docker containers. Based on an applied update strategy, or due to an individual tendency of a user to permit updates of the application software, different software versions are frequently present in data processing units 2.

Triggered by central unit 3, the users of particular data processing unit 2 may be prompted to update the application software according to a predefined update process, in particular by downloading and installing software. Since this is generally not possible for all data processing units 2 simultaneously or within a short period of time, due to limited data transmission capacities, the updates of the application software take place according to an update plan, which selects data processing units 2, on which the application software is to be updated, according to a sequence.

The update generally takes place by transmitting an update prompt to the user of data processing unit 2, which the latter must accept or which takes place automatically by a corresponding push message from central unit 3 to corresponding data processing units 2.

Figure 2:
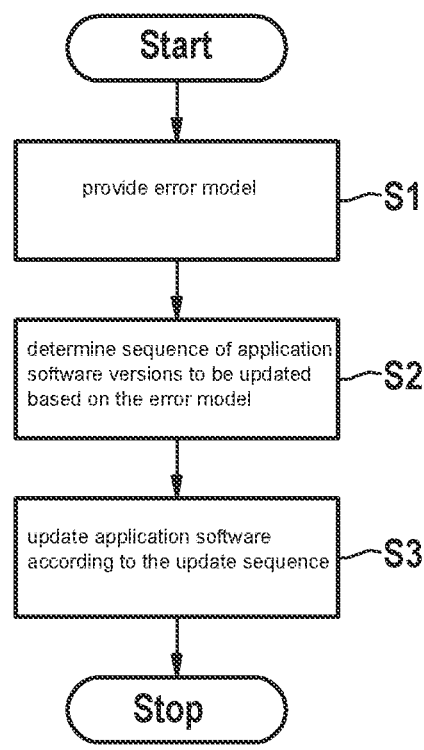
FIG. 2 shows a flowchart for illustrating a method for an update management of an application software in the data processing units, in accordance with an example embodiment of the present invention.

The method, which is carried out in the central unit 3 for selecting data processing units 2, is described in greater detail, based on the flowchart in FIG. 2. For this purpose, an error model is initially provided in step S1, which indicates a number of errors across the temporally continuous versions of the application software. The use of an error model of this type is possible, since it may be assumed in consecutive software versions that a portion of the errors of the previous software versions have been corrected, and new errors have been generated by adding additional program codes.

A sequence of the application software versions to be updated in data processing units 2 is now determined in step S2, based on the error model. For this purpose, the version which has the highest error frequency is updated with a higher priority than software versions which have a lower error frequency. In addition, the distribution of the particular software version in data processing units 2 may be taken into account when determining the sequence of the software versions to be updated.

For example, an extremely faulty software version having a high error frequency may receive a lower update priority if it is installed on only a very small share of data processing units 2. However, a software version having a small number of errors, for example, which is installed on a very large share of data processing units 2, may receive a higher update priority.

In step S3, an update of application software 2 is carried out according to the update sequence determined in step S2, in that the users of corresponding data processing units 2 are notified consecutively of the presence of an update.

The error model may be provided, for example, as a regression model, in particular as a Gaussian process model. The Gaussian process model may be trained according to training data with the aid of training data sets, which each indicate a number of errors assigned to a software version.

Figure 3:
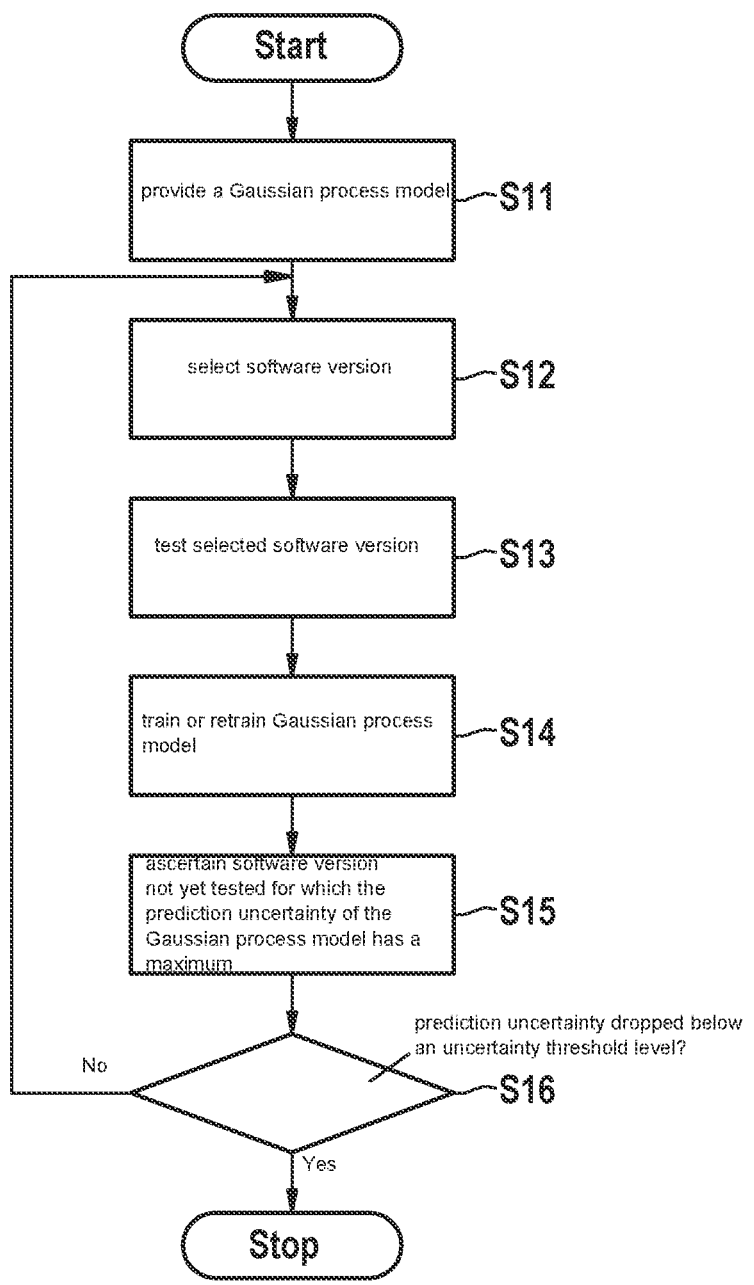
FIG. 3 shows a flowchart for illustrating a method for creating an error model, in accordance with an example embodiment of the present invention.

A flowchart for illustrating the method for creating the error model is explained in greater detail in FIG. 3.

In step S11, a Gaussian process model is initially provided as a possible error model. It is assumed that the number of errors does not change abruptly between consecutive software versions, i.e. a relative change in the number of errors is limited to a threshold value.

In step S12, a software version is selected, for which a fuzz test is carried out to obtain an indication of a number of errors. The software version may be initially selected manually or in a random manner.

In step S13, the selected software version is tested with the aid of a static or dynamic code test method, in particular a fuzz testing, or fuzzing, and/or a code analysis method. An error number of located errors is obtained as the result.

The Gaussian process model represents a non-parametric model, which may be trained based on training data. In addition to a mean value of an estimate, a prediction uncertainty may also be ascertained.

In step S14, the Gaussian process model is trained or retrained with the aid of the training data set, which results in each case from a software version and the corresponding number of errors.

In step S15, the software version not yet tested, for which the prediction uncertainty of the Gaussian process model has a maximum, is ascertained in a maximum search.

In step S16, a check is carried out as to whether the prediction uncertainty has dropped below an uncertainty threshold value. If this is established (alternative: yes), the method is ended, and the error model may be used. Otherwise (alternative: no), the method continues with step S12, and the software version, for which a maximum of the prediction uncertainty has been ascertained, is accepted as the selected software version.

To create the error model, the Gaussian process model may be updated with the aid of a training data set, which results in each case from a software version, for which the highest (or a maximum of a) prediction uncertainty results during the prediction of the number of errors. On the whole, an error model may be created, which includes a small number of analysis and/or test methods.

Figure 4:
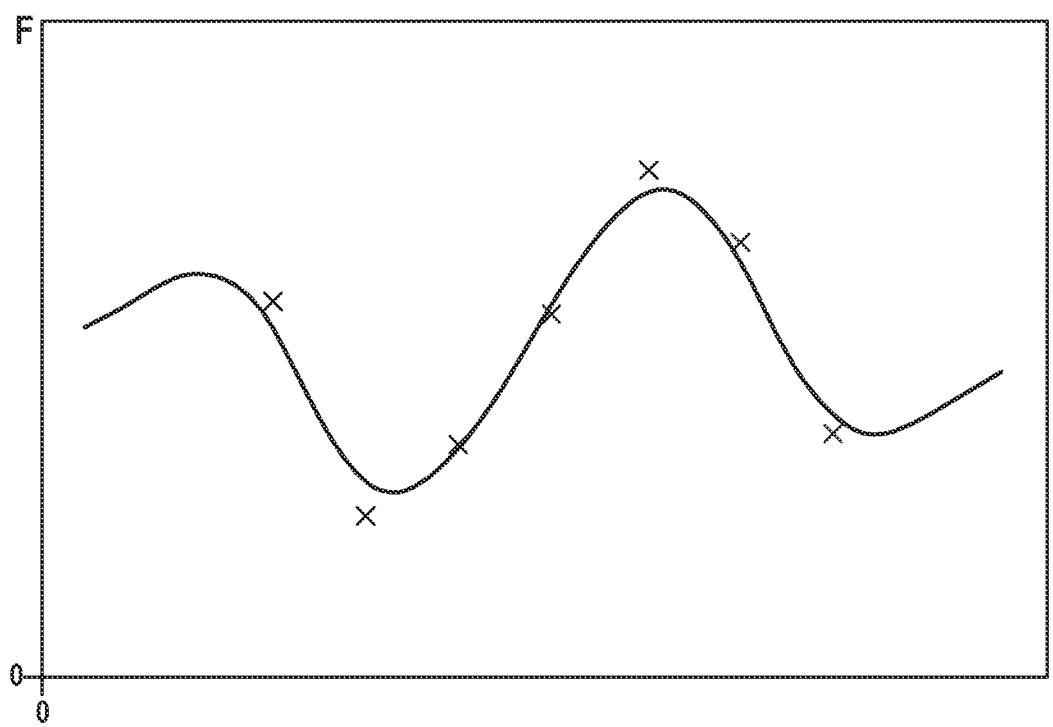
FIG. 4 shows a schematic representation of a diagram for illustrating the number of errors across continuous software versions of an application software, based on the error model.

The number of errors is ascertained, for example, with the aid of a so-called fuzz testing or fuzzing. For this purpose, a predefined input data set is used, which is further developed by the fuzzing process in such a way that preferably all program paths are run through. In the above method for creating the error model, an error model could be created, for example after seven iterations, as illustrated, for example, in FIG. 4. FIG. 4 shows a diagram of a profile of an error model, which includes an error number F plotted over a software version V. The software versions, which have actually been tested or analyzed during the course of the above method, are marked as Xs.

As an alternative model for the error model, a polynomial interpolation model may also be used, which is fitted to the error frequencies for different software versions.

What is claimed is:

1. A computer-implemented method for carrying out an update management for updating application software on data processing units, comprising the following steps:
    providing an error model that indicates a number of errors across software versions of the application software;
    determining an update sequence for the data processing units depending on respective ones of the software versions installed on the data processing units, wherein the update sequence is determined depending on the respective numbers of errors of the respective software versions according to the error model; and
    updating the application software or providing an update prompt to update the application software in the data processing units according to the update sequence.

2. The method as recited in claim 1, wherein the update sequence is determined additionally depending on respective ages of the respective software versions.

3. The method as recited in claim 1, wherein the update sequence is determined additionally depending on respective numbers of the data processing units on which different ones of the respective software versions are operated.

4. The method as recited in claim 1, wherein the error model includes a trainable regression model.

5. The method as recited in claim 4, wherein the error model is a Gaussian process model.

6. The method as recited in claim 1, wherein, for each of at least one of the software versions, the error model indicates a respective number of errors of the respective version as an expected number of errors without using a recordation of actual errors having occurred in the respective version.

7. A computer-implemented method for creating a data-based error model that assigns respective numbers of errors to each of a plurality of different versions of software, the method comprising the following steps:
    carrying out an analysis and/or test method to ascertain an actual respective number of errors determined to be actually present in each of one or more of a first subset of the versions; and
    performing an iterative training of the error model using a training data set to assign respective probabilistic numbers of errors to each of one or more of a second subset of the versions without testing to ascertain actual respective numbers of errors that are actually present in the versions of the second subset, the created data-based error model thereby including assignments for the first subset that are based on the ascertained actual respective numbers of errors and assignments for the second subset that are based on the training.

8. The method as recited in claim 7, wherein the carrying out of the analysis and/or test method to ascertain the actual respective number of errors is re-performed in each of the iterations of the performed iterative training.

9. A computer-implemented method for creating a data-based error model, which assigns a number of errors to a software version, the error model being successively trained by performing the following steps:
    carrying out an analysis and/or test method to ascertain a number of errors for a software version; and
    retraining the error model using a training data set that assigns a respective number of errors to a respective software version, wherein the retraining of the error model is ended when a maximum of a prediction uncertainty of the error model drops below a threshold value.

10. A computer-implemented method for creating a data-based error model, which assigns a number of errors to a software version, the error model being successively trained by performing the following steps:
    carrying out an analysis and/or test method to ascertain a number of errors for a software version; and
    retraining the error model using a training data set that assigns a respective number of errors to a respective software version, wherein the error model includes a regression model.

11. The method as recited in claim 10, wherein the regression model is a Gaussian process model or a Bayesian neural network.

12. An update management system, including a central unit, configured to carry out an update management for updating application software on data processing units, the update management system comprising a cloud processing server and a storage, wherein the cloud processing server is being configured to:
    receive a data-based error model, that indicates a number of errors across software versions of the application software;
    determine an update sequence for the data processing units depending on respective ones of the software versions installed on the data processing units, wherein the update sequence is determined depending on the respective numbers of errors of the respective software versions according to the error model; and update the application software or provide an update prompt to update the application software in the data processing units according to the update sequence.

13. A device for creating a data-based error model, which that assigns a number of errors to a software version, the device comprising a processor and a memory, the processor being configured to successively train the error model by performing the following steps:

carrying out an analysis and/or test method to ascertain a number of errors for a software version; and retraining the error model using a training data set, which assigns a respective number of errors to a respective software version, wherein the retraining of the error model is ended when a maximum of a prediction uncertainty of the error model drops below a threshold value; and the error model includes a regression model.

14. A non-transitory machine-readable storage medium on which is stored a computer program for carrying out an update management for updating application software on data processing units, the computer program, when executed by a data processing unit, causing the data processing unit to perform the following steps:

providing an error model that indicates a number of errors across software versions of the application software;

determining an update sequence for the data processing units depending on respective ones of the software versions installed on the data processing units, wherein the update sequence is determined depending on the respective numbers of errors of the respective software versions according to the error model; and updating the application software or providing an update prompt to update the application software in the data processing units according to the update sequence.

* * * * *